US011440230B2

(12) United States Patent
Lawless, III et al.

(10) Patent No.: US 11,440,230 B2
(45) Date of Patent: Sep. 13, 2022

(54) METHOD OF DETERMINING MELT FLOW FRONT TRAVEL USING INJECTION MELT PRESSURE AND SCREW POSITION TO GENERATE AN OUTPUT AND CONTINUOUSLY MONITOR CHECK RING REPEATABILITY

(71) Applicant: IMFLUX INC., Hamilton, OH (US)

(72) Inventors: William Francis Lawless, III, Medford, MA (US); Brandon Michael Birchmeier, Morrow, OH (US); Brian Matthew Burns, Mason, OH (US); Gene Michael Altonen, West Chester, OH (US); Ethan David Stiefel, Mason, OH (US); Bryler Collins, Milford, OH (US)

(73) Assignee: IMFLUX INC., Hamilton, OH (US)

( * ) Notice: Subject to any disclaimer, the term of this patent is extended or adjusted under 35 U.S.C. 154(b) by 241 days.

(21) Appl. No.: 16/364,966

(22) Filed: Mar. 26, 2019

(65) Prior Publication Data

US 2019/0308353 A1    Oct. 10, 2019

Related U.S. Application Data

(60) Provisional application No. 62/652,601, filed on Apr. 4, 2018.

(51) Int. Cl.
*B29C 45/76* (2006.01)
*B29C 45/17* (2006.01)
(Continued)

(52) U.S. Cl.
CPC ........ *B29C 45/768* (2013.01); *B29C 45/1732* (2013.01); *B29C 45/52* (2013.01);
(Continued)

(58) Field of Classification Search
CPC .... B29C 2045/776; B29C 2045/76056; B29C 2045/76381; B29C 2045/76545;
(Continued)

(56) References Cited

U.S. PATENT DOCUMENTS

2008/0099943 A1    5/2008  Yamagiwa et al.
2017/0015029 A1    1/2017  Altonen et al.
(Continued)

FOREIGN PATENT DOCUMENTS

EP        0228759 A2      7/1987
JP        H077919 U  *   2/1995

OTHER PUBLICATIONS

Partial International Search Report for PCT Application No. PCT/US2019/023070, dated May 27, 2019.
(Continued)

*Primary Examiner* — Michael M. Robinson
*Assistant Examiner* — Victoria Bartlett
(74) *Attorney, Agent, or Firm* — Marshall, Gerstein & Borun LLP (57) ABSTRACT

A method of determining melt flow front travel in a molding apparatus includes setting a sensor threshold, receiving a sensor amount as an output from a sensor monitoring a nozzle of the molding apparatus, and determining that the sensor amount exceeds the sensor threshold. The method further includes receiving a screw location, calculating a travel distance of the screw from the screw location, and calculating melt flow front travel based on the travel distance of the screw. The method further includes receiving, via an interface, an operator generated value for the desired melt flow front travel to be reached, and sending, via an interface, an analog or digital output after the operator generated value has been reached. A method of detecting a leaking condition of a check valve is also included.

18 Claims, 5 Drawing Sheets

(51) Int. Cl.
   *B29C 45/52* (2006.01)
   *B29C 45/77* (2006.01)
(52) U.S. Cl.
   CPC .......... *B29C 45/7613* (2013.01); *B29C 45/77* (2013.01); *B29C 2045/776* (2013.01); *B29C 2945/76056* (2013.01); *B29C 2945/76187* (2013.01); *B29C 2945/76381* (2013.01); *B29C 2945/76545* (2013.01); *B29C 2945/76665* (2013.01); *B29C 2945/76859* (2013.01)
(58) Field of Classification Search
   CPC ........... B29C 2045/76665; B29C 2045/76859; B29C 45/1732; B29C 45/52; B29C 45/7613; B29C 45/768; B29C 45/77; G05B 2219/2646
   See application file for complete search history.

(56) References Cited

U.S. PATENT DOCUMENTS

2017/0021544 A1* 1/2017 Pollard .................. B29C 45/77
2018/0001529 A1   1/2018 Altonen et al.

OTHER PUBLICATIONS

International Preliminary Report on Patentability for PCT Application No. PCT/US2019/023070, dated Jun. 25, 2020.
International Application No. PCT/US2019/023070, International Search Report and Written Opinion, dated Jul. 22, 2019.

\* cited by examiner

METHOD OF DETERMINING MELT FLOW FRONT TRAVEL USING INJECTION MELT PRESSURE AND SCREW POSITION TO GENERATE AN OUTPUT AND CONTINUOUSLY MONITOR CHECK RING REPEATABILITY

CROSS-REFERENCE TO RELATED APPLICATIONS

This application claims the benefit of the filing date of U.S. Provisional Patent Application No. 62/652,601, filed on Apr. 4, 2018, entitled "Method Of Determining Melt Flow Front Travel Using Injection Melt Pressure And Screw Position To Generate An Output And Continuously Monitor Check Ring Repeatability," the entire disclosure of which is hereby expressly incorporated by reference herein.

FIELD OF THE DISCLOSURE

This application relates generally to a method of determining melt flow front position or travel in molding systems and, more specifically, to a method of determining melt flow front travel within an injection molding system using a melt pressure at the injection unit nozzle, in conjunction with continuous monitoring of screw position, to continuously monitor check ring repeatability and accurately identify the position of the melt flow front within the cavity of an injection mold in order to generate an output. This output can be used to either transfer from velocity control to pressure control or to transfer from one pressure to another pressure.

BACKGROUND

At the start of an injection molding process, thermoplastic pellets are fed by a hopper into a heated barrel and driven to the end of the heated barrel by a reciprocating screw. The thermoplastic pellets melt into a molten thermoplastic material, and shots of thermoplastic material are injected through a nozzle. A check ring is provided in the barrel near the nozzle to prevent backflow of molten thermoplastic material. The molten thermoplastic material flows forward through either a cold runner or a hot runner to the valve gates of each individual cavity of a mold. After entering the valve gate or valve gates, the molten thermoplastic material fills a mold cavity formed between two or more sides of the mold held together under pressure by a press or clamping unit. During the filling of the mold, there is typically a change in how the part is filled once the melt flow front position has reached anywhere between 90%-99% of the total flow front length of the part. This change can either be a change from velocity control to pressure control for conventional injection molding processes or a change in one pressure set point to another pressure set point in a constant pressure process. This change takes place by generating an output, which is typically a 24V digital output, but may also be an analog output or a 0V-10V output. Once the shot of molten thermoplastic material is injected into the mold cavity, the reciprocating screw stops traveling forward. The molten thermoplastic material takes the form of the mold cavity and cools inside the mold until it solidifies. Then the clamping unit releases the mold sides and the finished part is ejected from the mold.

The injection molding process may vary depending on the type of injection molding being performed. For example, traditional injection molding machines inject the molten thermoplastic material at very high pressures, typically greater than 15,000 psi, for a first period of time, and thereafter hold the pressure for a second period of time at a lower but still relatively high pressure of 10,000 psi or more. More recently, constant low pressure multi-cavity injection molding systems have been developed that inject the molten plastic material into the mold cavity at a substantially constant low pressure, typically less than 6,000 psi, for a single time period. Other injection molding processes include metal injection molding (MIM), reaction injection molding (RIM), and liquid injection molding (LIM).

Whatever the type of injection molding process being carried out, accurately identifying the distance that the molten thermoplastic (or other) material has traveled in the press, i.e. the melt flow front travel, is important in order to create higher quality parts, minimize scraps, and repeatedly achieve parts having the same dimensions. Traditionally, injection molding systems have used the distance that the screw has traveled through the heated barrel as a proxy for melt flow front travel. This method has two key shortcomings. First, thermoplastic materials are non-Newtonian, meaning that they are elastic and compressible. As a result, the distance that the screw has traveled does not necessarily reliably correlate with the distance that the molten thermoplastic material has traveled because the molten material becomes compressed as it is pushed toward the nozzle, while the screw does not undergo any compression. Second, the check ring near the nozzle in an injection molding system tends to wear out and leak. The distance that the screw has traveled correlates even less with the distance that the molten thermoplastic material has traveled when some of the molten thermoplastic material has leaked out through the check ring.

Because check rings in injection molding systems tend to leak, they often must be replaced. Currently, a leaking check ring that must be replaced is typically identified after a batch of poorly formed parts is made, and the check ring is examined to see whether it is the cause of the issue. This results in a waste of energy and material in making the poorly formed parts.

Although there may be some other methods of continuous process monitoring, such as cushion monitoring, which may be an indication of an issue with check ring wear or leakage, there is the shortcoming that the cushion position (position of the screw at the very end of injection) is a result of the entire injection process and does not indicate if there is an issue with the check ring or if there is another cause such as a leaking of plastic within the mold cavity or leakage of plastic between the injection unit and the mold, both of which typically occur more towards the end of the process.

There are also industry standards such as a check ring repeatability study to determine if the performance of the check ring is satisfactory. However, the efficacy of a study such as this is marginal due to the infrequency in which they are typically performed. Additionally, the machine must be taken out of production and material scrap must be generated to perform the study. A preemptive and continuous method of detecting a leaking condition of a check ring is more desirable.

SUMMARY

Embodiments within the scope of the present disclosure are directed to determining melt flow front travel in a molding apparatus by first sensing melt pressure at the nozzle using a sensor, and then once a percentage of maximum melt pressure at the nozzle is sensed (i.e. melt flow front travel=0), calculating melt flow front travel throughout the remainder of the molding apparatus based on screw travel. The method of determining melt flow front travel may be used in an injection molding process, which is the primary process discussed herein. However, the method of determining melt flow front travel may alternately be used in other molding processes, such as a substantially constant pressure injection molding process, an injection-blow molding process, a blow molding process, a metal injection molding (MIM) process, a reaction injection molding (RIM) process, a liquid injection molding (LIM) process, a structural foam molding process, a liquid crystal polymer (LCP) molding process, and an injection-stretch blow molding process. With respect to the sensor used in the method, pressure transducers, and strain gauge sensors are the types of sensors primarily discussed. However other sensors capable of detecting internal conditions such as melt pressure, or other sensors determining properties of steel as a proxy or tell-tale for internal conditions such as melt pressure, could achieve the same purpose and are within the scope of the present disclosure. For example, microwave sensors, x-ray sensors, ultrasonic sensors, air pressure sensors, air temperature sensors, sub-surface temperature sensors, and other types of gauge sensors (electrical, electronic, mechanical, wireless, and fiber optic, for example) could be used as the sensor described and depicted below.

The method of determining melt flow front travel in a molding apparatus comprises setting, by one or more processors, a sensor threshold based on a percentage of maximum melt pressure. The method further includes receiving, via an interface, a sensor amount as an output from a sensor monitoring a nozzle of the molding apparatus, and determining, by the one or more processors, that the sensor amount exceeds the sensor threshold. The method then includes receiving, via an interface, a location of a screw of the molding apparatus. The method further comprises calculating, via the one or more processors, a travel distance of the screw from the location of the screw when the sensor amount exceeds the sensor threshold, and calculating, by the one or more processors, melt flow front travel based on the travel distance of the screw. The method further comprises receiving, via an interface, an operator generated value for the desired melt flow front travel to be reached. The method further comprises sending, via an interface, an analog or digital output after the desired user generated melt flow front travel value has been reached.

In essence, the first portion of the method is directed to determining whether the melt has traveled to the nozzle and is beginning to be extruded from the nozzle. By making this determination, inaccuracies in calculating melt flow front travel based on screw travel resulting from compression of the molten thermoplastic material are eliminated because screw travel is not measured until after the molten thermoplastic material has been fully compressed. Additionally, inaccuracies in calculating melt flow front travel based on screw travel resulting from leakage through a check ring are reduced because at least some of the material that is going to leak through the check ring has already leaked through the check ring by the time the molten thermoplastic material reaches the nozzle. The second portion of the method is then directed to using the distance that the screw has traveled to determine melt flow front travel to generate an output to change from velocity control to pressure control or to change from one pressure to another pressure in a constant pressure process.

In general, the sensor threshold is selected to correlate to any change that indicates the presence of melt flow front travel at the nozzle. In some embodiments, the sensor is a pressure transducer, the sensor amount is a pressure amount, and the sensor threshold is a pressure threshold. In such embodiments, the pressure threshold may be zero, as any pressure in the nozzle may indicate the presence of molten thermoplastic material. In other embodiments, the sensor is a strain gauge, the sensor amount is a change in strain amount, and the sensor threshold is a change in strain threshold. In such embodiments, the change in strain threshold may be zero, as any change in strain may indicate the presence of molten thermoplastic material. Additional information regarding use of a strain gauge sensor in a nozzle, such as by including a nozzle adapter, may be found in U.S. patent application Ser. No. 15/615,996, filed Jun. 7, 2017 and entitled "Upstream nozzle sensor for injection molding apparatus and methods of use," which is hereby incorporated by reference.

In some embodiments, the method may further include initiating, by one or more processors, a standard-setting series of molding cycles, and identifying, by the one or more processors, an average melt travel time for the standard-setting series of molding cycles. The method may further include setting, by the one or more processors, an acceptable margin from the average melt travel time, and initiating, by the one or more processors, additional molding cycles after the standard-setting series of molding cycles. The method may additionally include identifying for each of the additional molding cycles, by the one or more processors, a melt travel time, and when the melt travel time exceeds the average melt travel time plus the acceptable margin, initiating, by the one or more processors, a corrective action.

The steps of the method of determining melt flow front travel in a molding apparatus may be provided in a non-transitory computer-readable medium storing processor-executable instructions. Additionally, the steps of the method may be provided on a client device comprising one or more processors, one or more interfaces, and non-transitory computer-readable medium storing processor-executable instructions. While the predetermined threshold may be stored locally on the non-transitory computer-readable medium, the predetermined threshold may be capable of being adjusted, either locally by the operator or remotely, such as via an internet connection.

Embodiments within the scope of the present disclosure are also directed to a method of detecting a leaking condition of a check valve in a molding system. The method includes initiating, by one or more processors, a standard-setting series of molding cycles. The method then includes identifying, by the one or more processors, an average compression time for the standard-setting series of molding cycles, and setting an acceptable margin from the average compression time. An acceptable margin might range from 0.1-1.0 second. The method further includes initiating, by the one or more processors, additional molding cycles after the standard-setting series of molding cycles, and identifying for each of the additional molding cycles a cycle compression time. When the cycle compression time exceeds the average compression time plus the acceptable margin, the method includes initiating, by the one or more processors, a corrective action.

Identifying, by the one or more processors, an average compression time for the standard-setting series of molding cycles comprises setting, by the one or more processors, a sensor threshold that is identical for each of the series of standard-setting molding cycles, and associating a start time with a beginning of each of the standard-setting molding cycles. Identifying an average compression time further includes receiving, via an interface, a sensor amount as an output from a sensor monitoring a nozzle of the molding apparatus during each of the standard-setting molding cycles, and determining, by the one or more processors, that the sensor amount exceeds the sensor threshold during each of the series of standard-setting molding cycles. The method includes associating, by the one or more processors, an extrusion time with when the sensor amount first exceeded the sensor threshold for each of the series of standard-setting molding cycles. The method then includes calculating, by the one or more processors, a compression time equal to the extrusion time minus the start time for each of the series of molding cycles, and calculating an average compression time based on the average of the compression times for each of the series of standard-setting molding cycles.

As in the method of determining melt flow front travel previously discussed, the sensor threshold is any change that indicates the presence of melt flow front travel at the nozzle. In some embodiments, the sensor is a pressure transducer, the sensor amount is a pressure amount, and the sensor threshold is a pressure threshold. In such embodiments, the pressure threshold may be zero as any pressure in the nozzle may indicate the presence of molten thermoplastic material. In other embodiments, the sensor is a strain gauge, the sensor amount is a change in strain amount, and the sensor threshold is a change in strain threshold. In such embodiments, the change in strain threshold may be zero as any change in strain may indicate the presence of molten thermoplastic material.

The corrective action taken by the one or more processors when the cycle compression time exceeds the average compression time plus the acceptable margin should either alert a person monitoring the injection molding process that a check ring may be leaking or should stop additional molding cycles from being completed until the check ring has been inspected. Accordingly, the corrective action may include activating an alarm. The alarm may be visual or audible or any other type that would get the attention of a person monitoring the injection molding process. Alternately or in addition, the corrective action may include preventing the initiation of a molding cycle so as to avoid wasting material and/or creating malformed parts.

The method of detecting a leaking condition of a check valve in a molding system may be provided in a non-transitory computer-readable medium storing processor-executable instructions. Additionally, the method may be provided on a client device comprising one or more processors, one or more interfaces, and non-transitory computer-readable medium storing processor-executable instructions.

BRIEF DESCRIPTION OF THE DRAWINGS

While the specification concludes with claims particularly pointing out and distinctly claiming the subject matter that is regarded as the present disclosure, it is believed that the disclosure will be more fully understood from the following description taken in conjunction with the accompanying drawings. Some of the figures may have been simplified by the omission of selected elements for the purpose of more clearly showing other elements. Such omissions of elements in some figures are not necessarily indicative of the presence or absence of particular elements in any of the exemplary embodiments, except as may be explicitly delineated in the corresponding written description. None of the drawings are necessarily to scale.

DETAILED DESCRIPTION OF THE INVENTION

Figure 1:
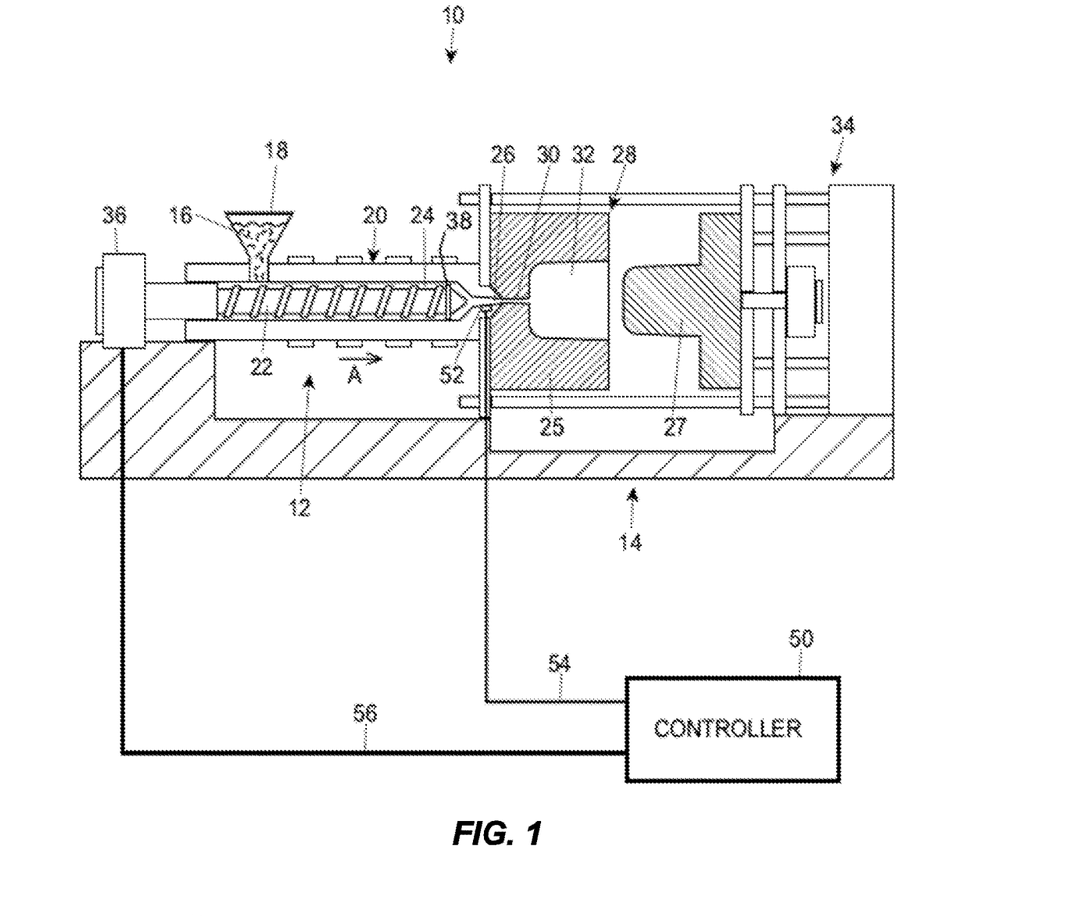
FIG. 1 is a semi-schematic, front elevation view of an injection molding system of the present disclosure.

Referring to the figures in detail, FIG. 1 illustrates an exemplary injection molding apparatus 10 for producing injection molded parts in high volumes (e.g., a class 101 or 30 injection mold, or an "ultra high productivity mold"). The injection molding apparatus 10 generally includes an injection system 12 and a clamping system 14. A thermoplastic material may be introduced to the injection system 12 in the form of thermoplastic pellets 16. The thermoplastic pellets 16 may be placed into a hopper 18, which feeds the thermoplastic pellets 16 into a heated barrel 20 of the injection system 12. The thermoplastic pellets 16, after being fed into the heated barrel 20, may be driven to the end of the heated barrel 20 by a reciprocating screw 22. The heating of the heated barrel 20 and the compression of the thermoplastic pellets 16 by the reciprocating screw 22 causes the thermoplastic pellets 16 to melt, forming a molten thermoplastic material 24. The molten thermoplastic material is typically processed at a temperature of about 130° C. to about 410° C.

The reciprocating screw 22 forces the molten thermoplastic material 24, toward a nozzle 26 to form a shot of thermoplastic material, which will be injected into a mold cavity 32 of a mold 28 via one or more gates. A check ring 38 is provided within the barrel toward a tip end of the reciprocating screw 22. The check ring 38 is coupled (e.g., attached) to a portion of the reciprocating screw 22, preferably at a position proximate a tip end of the screw 22. The check ring 38 is generally configured to prevent, or at least limit, a backflow of molten thermoplastic material 24 from flowing in a direction from the nozzle 26 toward the hopper 18. The molten thermoplastic material 24 may be injected through a gate 30, which directs the flow of the molten thermoplastic material 24 to the mold cavity 32. In other embodiments the nozzle 26 may be separated from one or more gates 30 by a feed system (not shown). The mold cavity 32 is formed between first and second mold sides 25, 27 of the mold 28 and the first and second mold sides 25, 27 are held together under pressure by a press or clamping unit 34. The press or clamping unit 34 applies a clamping force during the molding process that is greater than the force exerted by the injection pressure acting to separate the two mold halves 25, 27, thereby holding the first and second mold sides 25, 27 together while the molten thermoplastic material 24 is injected into the mold cavity 32. In a typical high variable pressure injection molding machine, the press typically exerts 30,000 psi or more because the clamping force is directly related to injection pressure. To support these clamping forces, the clamping system 14 may include a mold frame and a mold base.

Once the shot of molten thermoplastic material 24 is injected into the mold cavity 32, the reciprocating screw 22 stops traveling forward. The molten thermoplastic material 24 takes the form of the mold cavity 32 and the molten thermoplastic material 24 cools inside the mold 28 until the thermoplastic material 24 freezes, i.e., solidifies. Once the thermoplastic material 24 has solidified, the press 34 releases the first and second mold sides 25, 27, the first and second mold sides 25, 27 are separated from one another, and the finished part may be ejected from the mold 28. The mold 28 may include a plurality of mold cavities 32 to increase overall production rates. The shapes of the cavities of the plurality of mold cavities may be identical, similar or different from each other. (The latter may be considered a family of mold cavities).

A controller 50 is communicatively connected with a sensor 52, located in the vicinity of the nozzle 26, and a screw control 36. The controller 50 may include a microprocessor, a memory, and one or more communication links. When pressure or another parameter is measured by the sensor 52, the sensor 52 may send a signal (a sensor amount) indicative of the parameter to the controller 50. This signal may be used for purposes of determining melt flow front travel and detecting a leaking condition of a check valve 38, as discussed in greater detail below. For example, the sensor may be a pressure transducer and the sensor amount may be a pressure amount. Alternately, the sensor may be a strain gauge and the sensor amount may be a change in strain amount. In some arrangements, the sensor 52 may be located in a nozzle adapter located in the vicinity of the nozzle. For example, the sensor 52 may be a strain gauge pin located on in a strain gauge adapter, as discussed in U.S. patent application Ser. No. 15/615,996.

The controller 50 may be connected to the sensor 52 and the screw control 36 via wired connections 54, 56, respectively. In other embodiments, the controller 50 may be connected to the sensors 52 and screw control 36 via a wireless connection, a mechanical connection, a hydraulic connection, a pneumatic connection, or any other type of communication connection known to those having ordinary skill in the art that will allow the controller 50 to communicate with both the sensors 52, 53 and the screw control 36.

Figure 2:
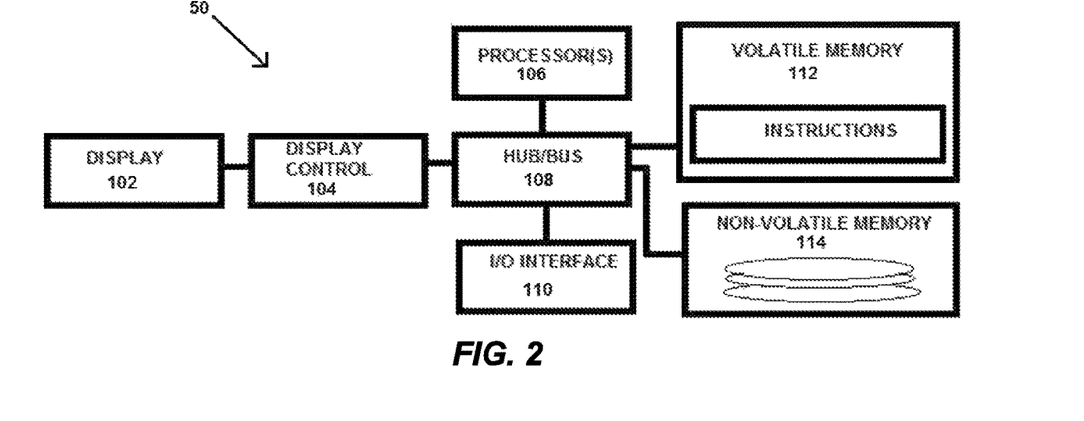
FIG. 2 is a block diagram of a controller of the present disclosure.

FIG. 2 illustrates a block diagram of an example controller 50 that may be utilized in a molding system. The controller 50 may include, for example, one more central processing units (CPUs) or processors 106, and one or more busses or hubs 108 that connect the processor(s) 106 to other elements of the virtual cavity sensor 50, such as a volatile memory 112, a non-volatile memory 114, a display controller 104 connected to a display 102, and an I/O interface 110. The volatile memory 112 and the non-volatile memory 114 may each include one or more non-transitory, tangible computer readable storage media such as random access memory (RAM), read only memory (ROM), FLASH memory, a biological memory, a hard disk drive, a digital versatile disk (DVD) disk drive, etc.

In an embodiment, the volatile memory 112 and/or the non-volatile memory 114 may store instructions that are executable by the processor 106. For example, in a molding apparatus particularly configured to perform the techniques described herein, the instructions may be the instructions executed by the controller 50. The illustrated controller 50 is only one example of a controller suitable to be particularly configured for use in a molding apparatus. Other embodiments of the controller may also be particularly configured for use in a molding apparatus, even if the other embodiments have additional, fewer, or alternative components than shown in FIG. 2, have one or more combined components, or have a different configuration or arrangement of the components. Moreover, the various components shown in FIG. 2 can be implemented in hardware, a processor executing software instructions, or a combination of both hardware and a processor executing software instructions, including one or more signal processing and/or application specific integrated circuits.

Figure 3:
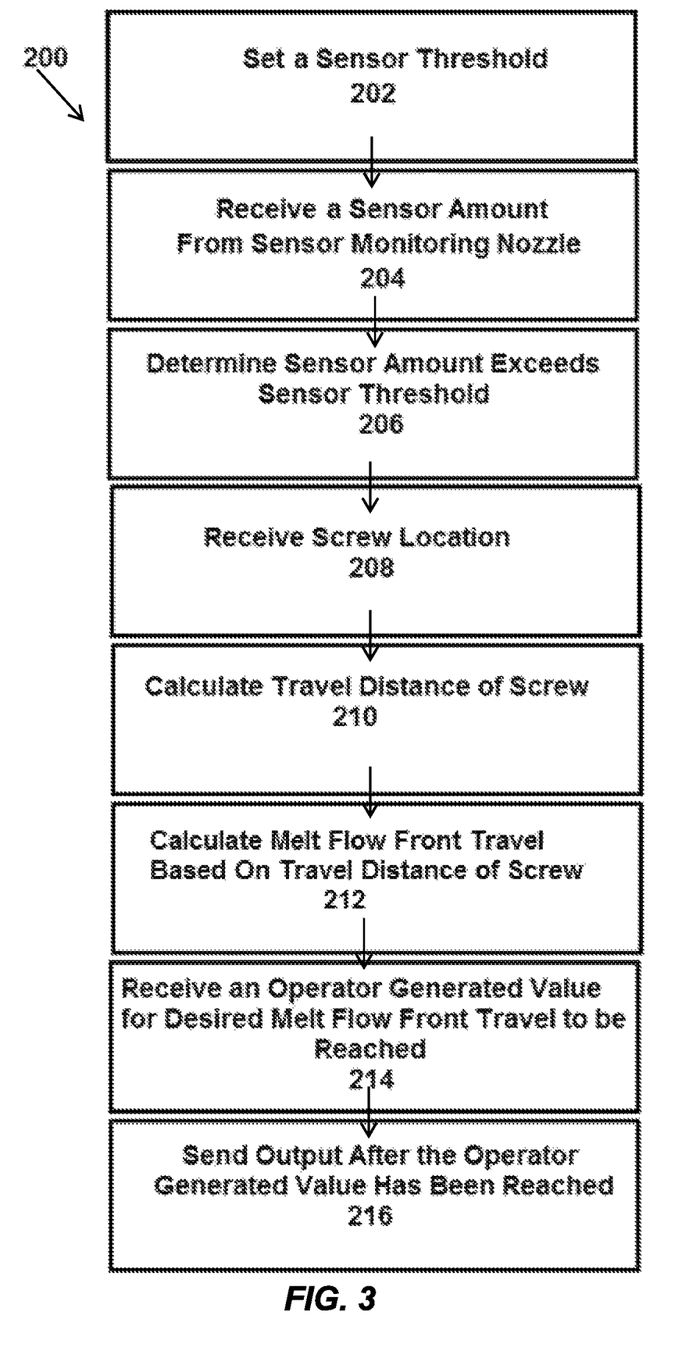
FIG. 3 is a flow chart of a method of determining melt flow front travel in a molding apparatus.

FIG. 3 illustrates a block diagram of a method 200 of determining melt flow front travel in a molding apparatus. Box 202 illustrates setting, by one or more processors, a sensor threshold. Box 204 illustrates receiving, via an interface, a sensor amount as an output from a sensor monitoring a nozzle of the molding apparatus. Box 206 illustrates determining, by the one or more processors, that the sensor amount exceeds the sensor threshold. Box 208 illustrates receiving, via an interface, data indicative of a location of a screw of the molding apparatus. Box 210 illustrates calculating, via the one or more processors, data indicative of a travel distance of the screw from the location of the screw when the sensor amount exceeds the sensor threshold. Box 212 illustrates calculating, by the one or more processors, melt flow front travel based on the travel distance of the screw. Box 214 illustrates receiving, via an interface, an operator generated value for the desired melt flow front travel to be reached. Box 216 illustrates sending, via an interface, an analog or digital output after the operator generated value has been reached.

Figure 4:
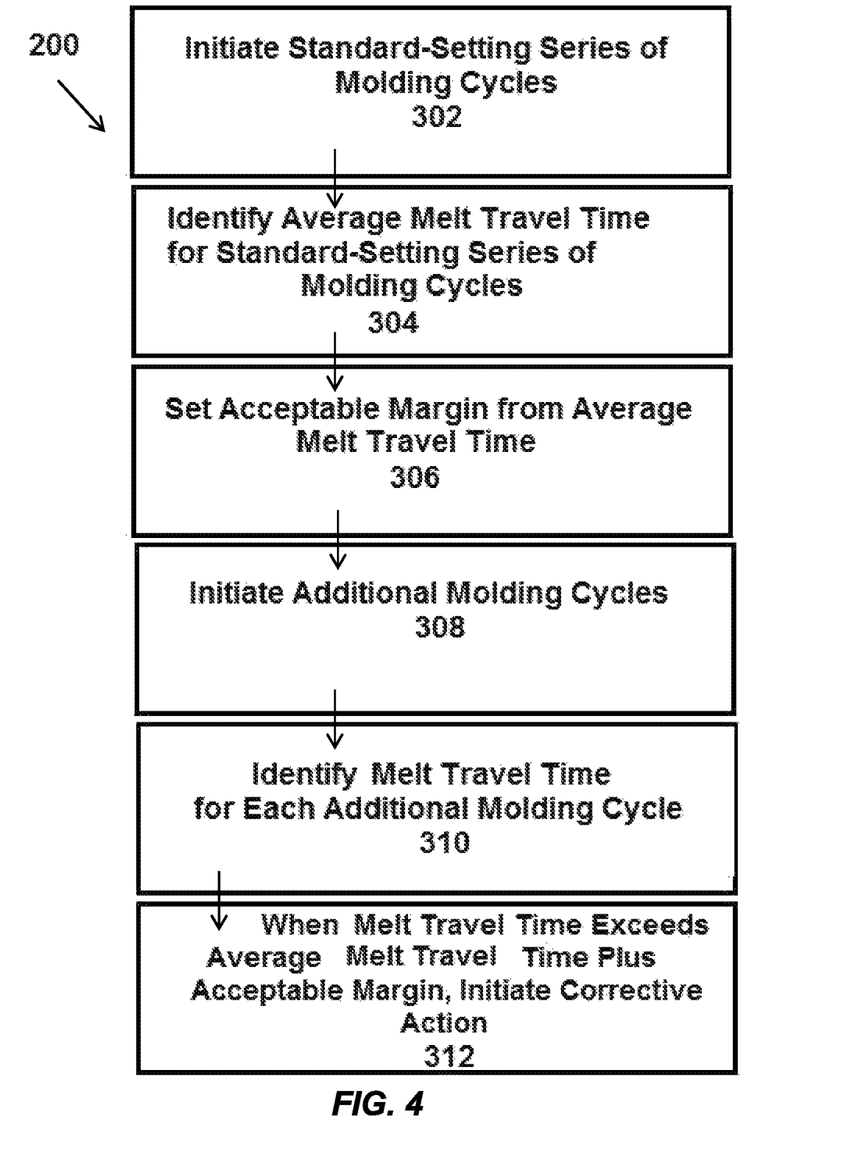
FIG. 4 is a flow chart of the method of FIG. 3 including additional optional steps.

FIG. 4 illustrates a block diagram of additional optional steps for method 200. Box 302 illustrates initiating, by one or more processors, a standard-setting series of molding cycles. Box 304 illustrates identifying, by the one or more processors, an average melt travel time for the standard-setting series of molding cycles. Box 306 illustrates setting, by the one or more processors, an acceptable margin from the average melt travel time. Box 308 illustrates initiating, by the one or more processors, additional molding cycles after the standard-setting series of molding cycles. Box 310 illustrates identifying for each of the additional molding cycles, by the one or more processors, a melt travel time. Box 312 illustrates when the melt travel time exceeds the average melt travel time plus the acceptable margin, initiating, by the one or more processors, a corrective action. For example, the corrective action could be causing a visual or audial alert for an operator or ceasing operation of the molding apparatus.

Figure 5:
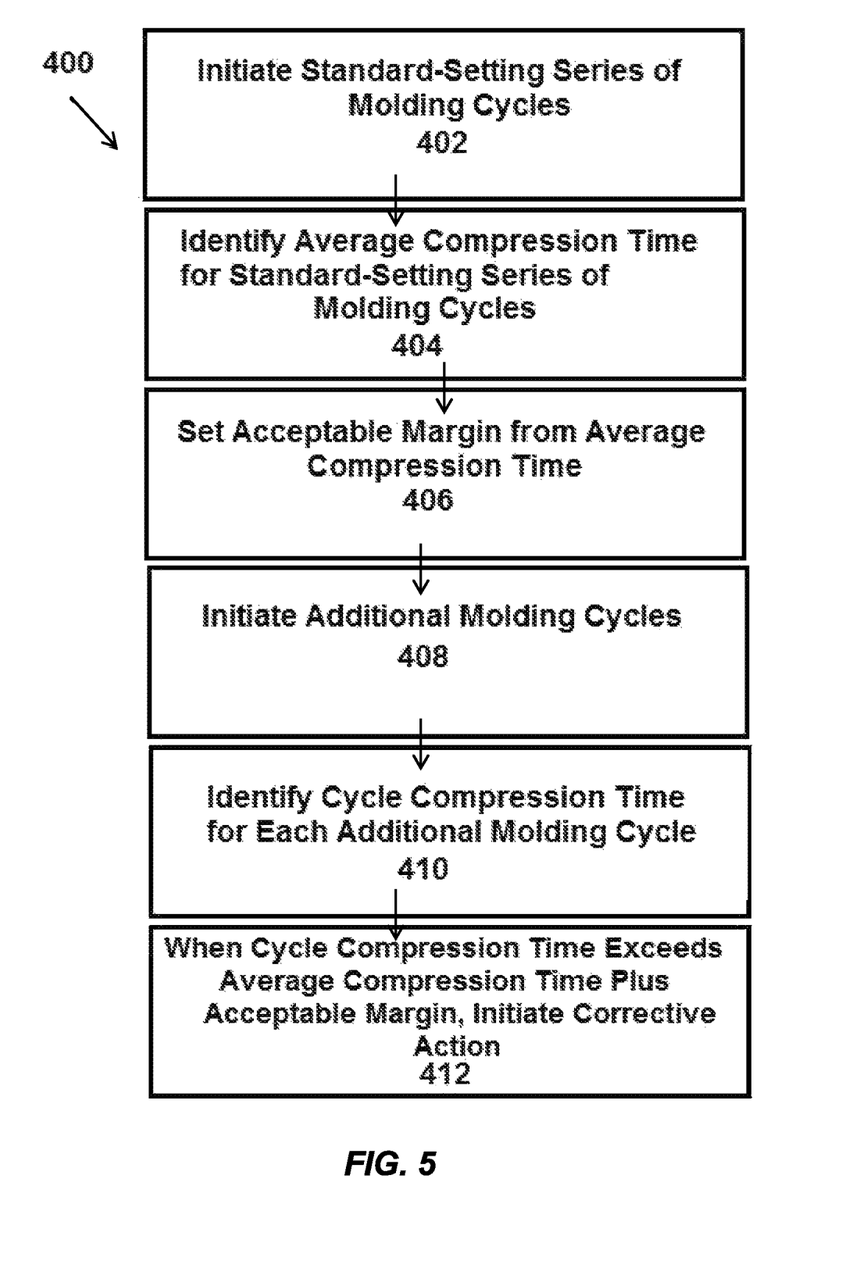
FIG. 5 is a flow chart of a method of detecting a leaking condition of a check valve in a molding system.

FIG. 5 illustrates a block diagram of a method 400 of detecting a leaking condition of a check valve in a molding system. Box 402 illustrates initiating, by one or more processors, a standard-setting series of molding cycles. Box 404 illustrates identifying, by the one or more processors, an average compression time for the standard-setting series of molding cycles. Box 406 illustrates setting, by the one or more processors, an acceptable margin from the average compression time. An acceptable margin might be 0.1-1.0 second. Box 408 illustrates initiating, by the one or more processors, additional molding cycles after the standard-setting series of molding cycles. Box 410 illustrates identifying for each of the additional molding cycles, by the one or more processors, a cycle compression time. Box 412 illustrates when the cycle compression time exceeds the average compression time plus the acceptable margin, initiating, by the one or more processors, a corrective action.

Figure 6:
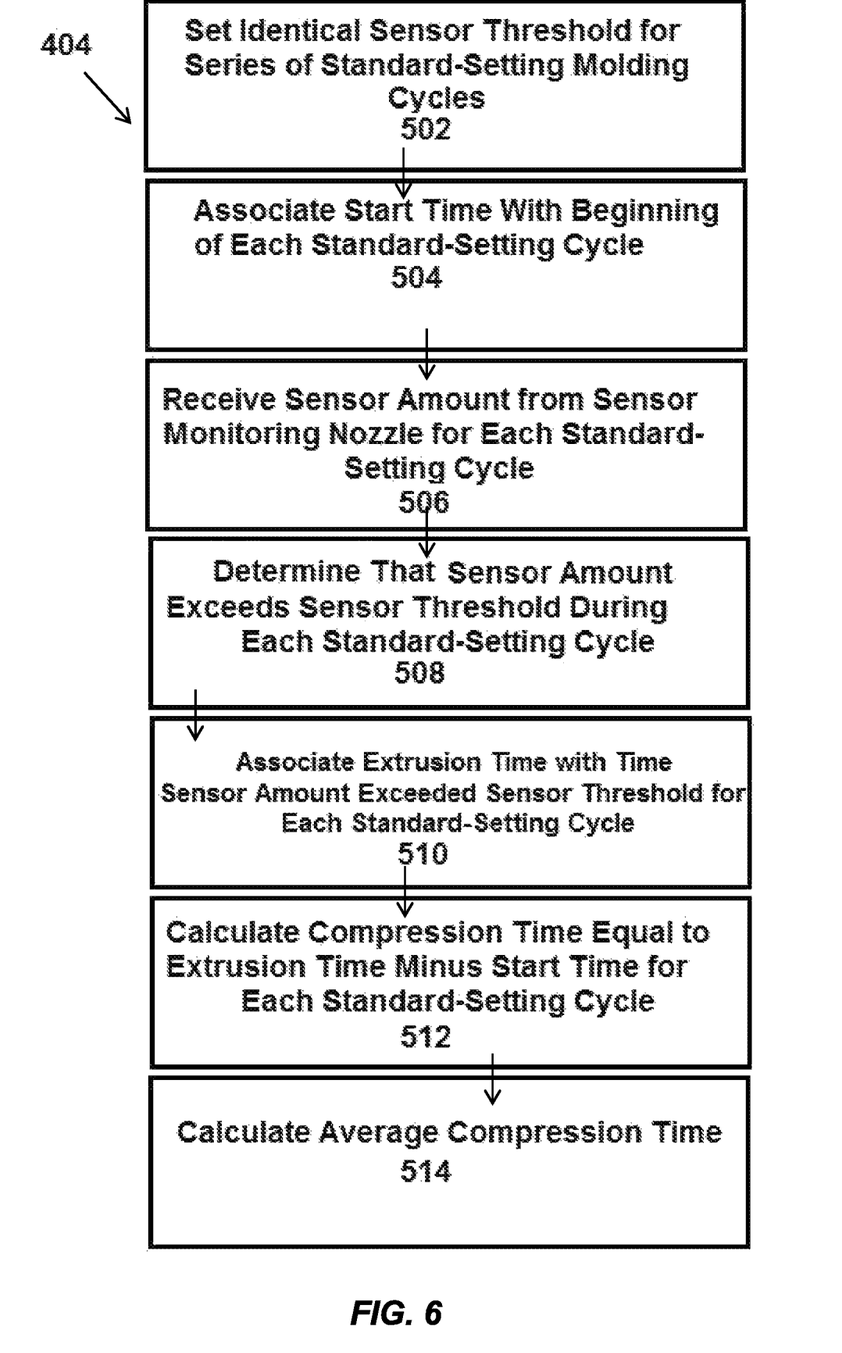
FIG. 6 is a flow chart of a method of identifying an average compression time for the method disclosed in FIG. 5.

FIG. 6 illustrates a block diagram of box 404 in FIG. 5, which is directed to identifying, by the one or more processors, an average compression time for the standard-setting series of molding cycles. Box 502 illustrates setting, by the one or more processors, a sensor threshold that is identical for each of the series of standard-setting molding cycles. Box 504 illustrates associating, by the one or more processors, a start time with a beginning of each of the standard-setting molding cycles. Box 506 illustrates receiving, via an interface, a sensor amount as an output from a sensor monitoring a nozzle of the molding apparatus during each of the standard-setting molding cycles. Box 508 illustrates determining, by the one or more processors, that the sensor amount exceeds the sensor threshold during each of the series of standard-setting molding cycles. Box 510 illustrates associating, by the one or more processors, an extrusion time with when the sensor amount first exceeded the sensor threshold for each of the series of standard-setting molding cycles. Box 512 illustrates calculating, by the one or more processors, a compression time equal to the extrusion time minus the start time for each of the series of molding cycles. Box 514 illustrates calculating, by the one or more processors, an average compression time based on the average of the compression times for each of the series of molding cycles.

While specific embodiments have been described herein, variations may be made to the described embodiments that are still considered within the scope of the appended claims.

What is claimed is:

1. A method of determining melt flow front travel in a molding apparatus comprising:
setting, by one or more processors, a sensor threshold that correlates to any change that indicates that a molten thermoplastic material is beginning to be extruded from a nozzle of the molding apparatus;
initiating, by the one or more processors, a standard-setting series of molding cycles, for each of the standard-setting series of molding cycles:
receiving, via an interface, a sensor amount as an output from a sensor monitoring the nozzle of the molding apparatus;
determining, by the one or more processors, that the sensor amount exceeds the sensor threshold;
receiving, via an interface, a location of a screw of the molding apparatus at the moment it is determined that the sensor amount exceeds the sensor threshold;
calculating, via the one or more processors, a travel distance of the screw from the location of the screw once the sensor amount exceeds the sensor threshold, wherein the travel distance of the screw is not calculated until the sensor amount exceeds the sensor threshold;
calculating, by the one or more processors, melt flow front travel based on the travel distance of the screw;
receiving, via an interface, an operator generated value for a desired melt flow front travel to be reached; and
sending, via an interface, an analog or digital output after the operator generated value has been reached;
identifying, by the one or more processors, an average melt travel time for the standard-setting series of molding cycles;
setting, by the one or more processors, an acceptable margin from the average melt travel time;
initiating, by the one or more processors, additional molding cycles after the standard-setting series of molding cycles;
identifying for each of the additional molding cycles, by the one or more processors, a melt travel time; and
when the melt travel time exceeds the average melt travel time plus the acceptable margin, initiating, by the one or more processors, a corrective action.

2. The method of claim 1, wherein the sensor is a pressure transducer, the sensor amount is a pressure amount, and the sensor threshold is a pressure threshold.

3. The method of claim 2, wherein the pressure threshold is zero.

4. The method of claim 2, wherein the pressure threshold is a percentage of a maximum melt pressure at the nozzle.

5. The method of claim 1, wherein the sensor is a strain gauge, the sensor amount is a change in strain amount, and the sensor threshold is a change in strain threshold.

6. The method of claim 5, wherein the change in strain threshold is zero.

7. A non-transitory computer-readable storage medium storing processor-executable instructions that, when executed, cause one or more processors to:
set a sensor threshold that correlates to any change that indicates that a molten thermoplastic material is beginning to be extruded from a nozzle of a molding apparatus;
initiate a standard-setting series of molding cycles, for each of the standard-setting series of molding cycles;
receive, via an interface, a sensor amount as an output from a sensor monitoring the nozzle of the molding apparatus;
determine that the sensor amount exceeds the sensor threshold;
receive, via an interface, a location of a screw of the molding apparatus at the moment it is determined that the sensor amount exceeds the sensor threshold;
calculate a travel distance of the screw from the location of the screw once the sensor amount exceeds the sensor threshold, where the travel distance of the screw is not calculated until the sensor amount exceeds the sensor threshold;
calculate melt flow front travel based on the travel distance of the screw;
receive, via an interface, an operator generated value for a desired melt flow front travel to be reached; and
send, via an interface, an analog or digital output after the operator generated value has been reached;
identify an average melt travel time for the standard-setting series of molding cycles;
set an acceptable margin from the average melt travel time;
initiate additional molding cycles after the standard-setting series of molding cycles;
identify, for each of the additional molding cycles, a melt travel time; and
when the melt travel time exceeds the average melt travel time plus the acceptable margin, initiate a corrective action.

8. The non-transitory computer-readable storage medium storing processor-executable instructions of claim 7, wherein the sensor is a pressure transducer, the sensor amount is a pressure amount, and the sensor threshold is a pressure threshold.

9. The non-transitory computer-readable storage medium storing processor-executable instructions of claim 8, wherein the pressure threshold is zero.

10. The non-transitory computer-readable storage medium storing processor-executable instructions of claim 8, wherein the pressure threshold is a percentage of a maximum melt pressure at the nozzle.

11. The non-transitory computer-readable storage medium storing processor-executable instructions of claim 7, wherein the sensor is a strain gauge, the sensor amount is a change in strain amount, and the sensor threshold is a change in strain threshold.

12. The non-transitory computer-readable storage medium storing processor-executable instructions of claim 11, wherein the change in strain threshold is zero.

13. A client device comprising one or more processors, one or more interfaces, and a non-transitory computer-readable memory storing thereon instructions that, when executed by the one or more processors, cause the client device to:
- set a sensor threshold that correlates to any change that indicates that a molten thermoplastic material is beginning to be extruded from a nozzle of the molding apparatus;
- initiate a standard-setting series of molding cycles, for each of the standard-setting series of molding cycles;
- receive, via an interface, a sensor amount as an output from a sensor monitoring the nozzle of the molding apparatus;
- determine whether the sensor amount exceeds the sensor threshold;
- receive, via an interface, a location of a screw of the molding apparatus at the moment it is determined that the sensor amount exceeds the sensor threshold;
- calculate a travel distance of the screw from the location of the screw once the sensor amount exceeds the sensor threshold, wherein the travel distance of the screw is not calculated until the sensor amount exceeds the sensor threshold;
- calculate melt flow front travel based on the travel distance of the screw;
- receive, via an interface, an operator generated value for a desired melt flow front travel to be reached; and
- send, via an interface, an analog or digital output after the operator generated value has been reached;
- identify an average melt travel time for the standard-setting series of molding cycles;
- set an acceptable margin from the average melt travel time;
- initiate additional molding cycles after the standard-setting series of molding cycles;
- identify, for each of the additional molding cycles, a melt travel time; and
- when the melt travel time exceeds the average melt travel time plus the acceptable margin, initiate a corrective action.

14. The client device comprising one or more processors, one or more interfaces, and a non-transitory computer-readable memory storing thereon instructions of claim 13, wherein the sensor is a pressure transducer, the sensor amount is a pressure amount, and the sensor threshold is a pressure threshold.

15. The client device comprising one or more processors, one or more interfaces, and a non-transitory computer-readable memory storing thereon instructions of claim 14, wherein the pressure threshold is zero.

16. The client device comprising one or more processors, one or more interfaces, and a non-transitory computer-readable memory storing thereon instructions of claim 14, wherein the pressure threshold is a percentage of a maximum melt pressure at the nozzle.

17. The client device comprising one or more processors, one or more interfaces, and a non-transitory computer-readable memory storing thereon instructions of claim 13, wherein the sensor is a strain gauge, the sensor amount is a change in strain amount, and the sensor threshold is a change in strain threshold.

18. The client device comprising one or more processors, one or more interfaces, and a non-transitory computer-readable memory storing thereon instructions of claim 17, wherein the change in strain threshold is zero.

* * * * *